No. 12,063. Reissued Dec. 16, 1902.

J. D. O'BRIEN.

GARMENT HOLDER.

(Application filed July 12, 1902.)

Witnesses,
Everett S. Emery
Thomas B. Brock

Inventor;
John D. O'Brien,
by Frederick L. Emery
Atty.

UNITED STATES PATENT OFFICE.

JOHN D. O'BRIEN, OF BOSTON, MASSACHUSETTS.

GARMENT-HOLDER.

SPECIFICATION forming part of Reissued Letters Patent No. 12,033, dated December 16, 1902.

Original No. 685,935, dated November 5, 1901. Application for reissue filed July 12, 1902. Serial No. 115,315.

*To all whom it may concern:*

Be it known that I, JOHN D. O'BRIEN, a citizen of the United States, residing at Boston, in the county of Suffolk and Commonwealth of Massachusetts, have invented an Improvement in Garment-Holders, of which the following description, in connection with the accompanying drawings, is a specification, like letters on the drawings representing like parts.

This invention has for its object the production of a novel garment-holder which may be used to embrace a stud or button overlaid with fabric, such as a stocking, and afford a non-metallic interior in contact with the fabric, thereby to induce an efficient grip which will not slip.

Figure 1:
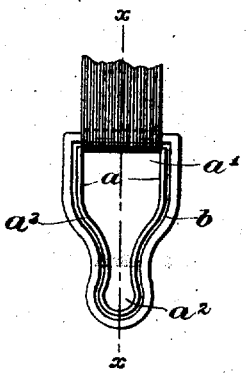
Figure 2:
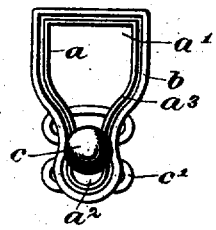
Figure 3:
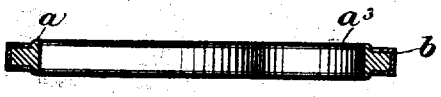
Figure 4:
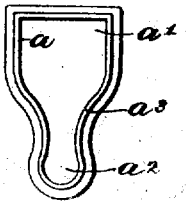

Figure 1 of the drawings shows one of my improved holders, it having connected with it a tape, forming part of the stocking-supporter. Fig. 2 is a like view with the button forming a coacting part of the holder in operative position, the fabric which the holder would engage when the parts are in such position being omitted. Fig. 3 is an enlarged section on the line $x$, Fig. 1; and Fig. 4 shows the body separate from the tape.

In the production of my improved holder, when constructed as shown in the drawings, I form an elastic body $a$, which may be of india-rubber suitably vulcanized, or it may be felt. This body has an enlarged opening $a'$, which is contracted at one end, as at $a^2$, to form a receiving-throat. Viewing Fig. 3 of the drawings illustrating one form of my invention, the body has at its inner edge a flange $a^3$, said flange extending, as represented, in opposite directions from the main outer portion of the body. The main outer portion of the body is embraced by a suitable metallic binding, as $b$, said binding maintaining the elastic body in the desired shape and insuring that the contracted throat may receive in it the shank of the button $c$, carried by a base $c'$, the button receiving over it in the usual manner the fabric to be held, said binding preventing the expansion of the body to such a degree as to fail to hold the fabric. The binding embraces the outer edge of the body firmly, the binding being sufficiently stiff, like a frame, to afford the necessary rigidity to the holder in the direction of its length. The broad inner edge of the elastic body yields somewhat to the action of the fabric overlying the button and by its width exerts a very considerable amount of friction, thereby insuring a firm engagement and secure holding of the material overlying the button.

While it is convenient to give to the body the full shape of the holder and bind it throughout with the metal binding, it is only essential that the elastic or yielding body extend about the holding portion of the throat at the point where the fabric is gripped.

This invention is not limited to the exact shape of the binding so long as the latter coacts with and stiffens the outer edge of the body.

Having described my invention, and without limiting myself in the matter of details, what I claim, and desire to secure by Letters Patent, is—

1. In a garment-holder comprising a body of elastic material shaped to present an enlarged portion and a contracted portion leading from said enlarged portion, the said elastic body presenting a thickened inner edge in the contracted portion to engage the article to be supported and having a relatively narrow outer edge, and a metallic binding clamped to the said narrow outer edge of the elastic body portion, the thicker inner edge of the elastic body projecting beyond the edges of the metal binding.

2. A garment-holder comprising a body of elastic material shaped to present an enlarged portion for engagement with a supporting-tape and a contracted portion opposite the enlarged portion, the said elastic body presenting an inner edge thicker than the main part of the elastic body portion for engaging the article to be supported, and a metallic binding secured to the relatively thin exterior or main part of the elastic body whereby the thicker inner edge projects beyond the metal binding on either side thereof.

3. In a garment-holder, a body composed of an elastic material presenting an elongated contracted opening at one end to form a throat and a metal binding secured to the exterior of said body, the said elastic body being provided with flanges on its inner edge to present increased bearing-surface for the object to be supported, the said flanges of the elastic body projecting beyond the metal binding on each side of the holder.

4. In a garment-holder, a body comprised of a yielding material presenting an elongated contracted opening at one end to form a throat and a metal binding secured to said body and about the exterior edge thereof and shaped to form an enlarged fabric-receiving portion above said throat, with its end opposite said throat closed for engagement with a supporting-tape.

5. A garment-holder comprising a frame-like loop having an enlarged fabric-receiving portion with a contracted throat portion leading therefrom, said loop in the vicinity of said throat receiving and clamping a lining-body of yielding material securing the same about the exterior edge thereof.

6. A garment-holder comprising a closed frame-like loop made from a member having a substantially U-shaped cross-section, said loop being formed to present an enlarged fabric-receiving portion and a contracted throat portion leading therefrom, and a lining-body of yielding material inserted in and about the interior of the throat portion of said loop and held by and between the side walls thereof.

In witness whereof I have hereunto set my hand.

JOHN D. O'BRIEN.

Witnesses:
T. F. FINNIN,
EVERETT S. EMERY.